United States Patent
Kirby et al.

(10) Patent No.: US 7,161,528 B2
(45) Date of Patent: Jan. 9, 2007

(54) DEVICE AND METHOD FOR THE SUPPRESSION OF PULSED WIRELESS SIGNALS

(75) Inventors: Estelle Kirby, Valence (FR); Alain Renard, Chabeuil (FR)

(73) Assignee: Thales, Paris (FR)

( * ) Notice: Subject to any disclaimer, the term of this patent is extended or adjusted under 35 U.S.C. 154(b) by 152 days.

(21) Appl. No.: 10/467,625

(22) PCT Filed: Dec. 20, 2002

(86) PCT No.: PCT/FR02/04509

§ 371 (c)(1),
(2), (4) Date: Jul. 8, 2004

(87) PCT Pub. No.: WO03/058270

PCT Pub. Date: Jul. 17, 2003

(65) Prior Publication Data

US 2005/0104767 A1 May 19, 2005

(30) Foreign Application Priority Data

Jan. 8, 2002 (FR) .................................. 02 00163

(51) Int. Cl.
*G01S 7/292* (2006.01)
*G01S 7/285* (2006.01)
*G01S 13/00* (2006.01)

(52) U.S. Cl. .................. 342/159; 342/42; 342/46; 342/47; 342/89; 342/175; 342/195; 342/357.01; 342/357.06; 375/130; 375/259; 375/285; 375/316; 375/346; 375/349; 375/350; 708/300; 708/314; 708/322; 455/500; 455/501; 455/63.1; 455/67.11; 455/67.13; 455/296; 455/303; 455/307

(58) Field of Classification Search ................. 342/13, 342/16–20, 89–93, 159, 175, 189, 192–197, 342/42, 46, 47, 118, 125, 357.01–357.17; 375/130–153, 229–236, 316, 346–351, 244–252, 375/259, 285; 380/255, 38, 39, 40, 287, 380/59, 33, 34; 708/300–323; 381/71.8, 381/71.9, 71.11–71.14; 370/203, 210, 282–292; 379/406.01–406.16; 455/500–506, 63.1–63.4, 455/64, 65, 67.11, 67.13, 67.15, 67.16, 67.7, 455/270–272, 278.1, 283–288, 296–312

See application file for complete search history.

(56) References Cited

U.S. PATENT DOCUMENTS 4,319,082 A * 3/1982 Gilloire et al. .............. 375/245

(Continued)

FOREIGN PATENT DOCUMENTS

| EP | 0 987 829 A | 3/2000 |
|---|---|---|
| WO | 01 77705 A | 10/2001 |

OTHER PUBLICATIONS

Roturier: "report on DME interference on GPS/L5 (third version, Jul. 99)"; report by Eurocontrol (EATMP,SMA); Sep. 3, 2001, XP002214743.

(Continued)

*Primary Examiner*—Bernarr E. Gregory
(74) *Attorney, Agent, or Firm*—Lowe Hauptman & Berner, LLP

(57) ABSTRACT

The invention relates to a method of suppressing pulsed signals in particular of DME or TACAN type present in the radio signals received (Ue) by a radio-frequency receiver, characterized in that the reception frequency band of the receiver is divided into frequency sub-bands corresponding to the transmission channels of the pulsed signals, in that the presence of the pulsed signals and the transmission channel of said pulsed signals in the frequency sub-bands are detected, and in that the frequency sub-band comprising the detected pulsed signals is filtered over the duration of the pulsed signal so as to eliminate said pulsed signals pulse type.

20 Claims, 4 Drawing Sheets

U.S. PATENT DOCUMENTS

| | | | | |
|---|---|---|---|---|
| 4,623,980 A | * | 11/1986 | Vary | 708/313 |
| 4,956,838 A | * | 9/1990 | Gilloire et al. | 370/291 |
| 5,425,105 A | * | 6/1995 | Lo et al. | 381/71.8 |
| 5,561,667 A | * | 10/1996 | Gerlach | 370/286 |
| 5,561,668 A | * | 10/1996 | Genter | 370/288 |
| 6,141,371 A | | 10/2000 | Holmes et al. | |
| 6,396,872 B1 | * | 5/2002 | Sugiyama | 375/232 |
| 6,426,983 B1 | * | 7/2002 | Rakib et al. | 375/346 |
| 6,546,057 B1 | * | 4/2003 | Yeap | 375/285 |
| 6,628,781 B1 | * | 9/2003 | Grundstrom et al. | 379/406.14 |
| 6,650,271 B1 | * | 11/2003 | Simone et al. | 342/16 |

OTHER PUBLICATIONS

Landry et al; "Analysis of potential interference source and assessment of present solutions for GPS/GNSS receivers" INS International Conference on Integrated Navigation, Saint-Petersburg, Russia; May 26-28, 1997, XP002214744.

* cited by examiner

DEVICE AND METHOD FOR THE SUPPRESSION OF PULSED WIRELESS SIGNALS

CROSS-REFERENCE TO RELATED APPLICATIONS

The present application is based on International Application No. PCT/FR02/04509 filed on Dec. 20, 2002, entitled "METHOD OF SUPPRESSING PULSED RADIO SIGNALS AND DEVICE FOR IMPLEMENTING THE METHOD", which in turn corresponds to French Application No. FR 02/00163 filed on Jan. 8, 2002, and priority is hereby claimed under 35 USC 119 based on these applications. Each of these applications are hereby incorporated by reference in their entirety into this application.

FIELD OF THE INVENTION

The invention relates to a method making it possible to suppress in a radio signal received by a receiver, pulsed signals, in particular those transmitted by civil distance measuring equipment, or DME, between an aircraft and a ground beacon.

BACKGROUND OF THE INVENTION

The use of the L5 radio frequency band for the global radio locating system or GPS (the anglicized version of the "Navstar Global Positioning System") in the civil sector or, of the E5 band for the European GALILEO system poses the problem of compatibility with the signals transmitted by DME.

Specifically, one of the problems posed by the transmission of data by spread spectrum radio signals, such as those of GPS signals or those of GALILEO, is the sensitivity of the receivers to jammers having regard to the low powers involved and to the considerable distances separating the transmitters and the receivers.

The signal in the frequency bands for civil GPS III is obtained by the modulation of a carrier by a first signal, "pilot pathway", producing a modulation spectrum of a width of the order of 20 MHz and by a second quadrature signal modulated by the navigation message, "data pathway", producing a second 20 MHz modulation spectrum.

FIG. 1 represents an exemplary pulsed signal transmitted by distance measuring equipment (DME) between a ground beacon and an aircraft. We shall subsequently refer to this signal as the DME signal. FIGS. 2a and 2b respectively represent the frequency profile of a pulse and of a pair of pulses.

The DME signal comprises two pulses spaced apart by a mode dependent predetermined time t0 (ARINC standard 709 A). For example, in the X mode of ground beacons, this spacing time t0 between the pulses is of the order of 12 µS. The pair of pulses is repeated with a frequency of the order of 2700 pulse pairs per second. Each pulse has a Gaussian shaped envelope and a beacon dependent carrier frequency.

Each ground beacon is recognized by the aircraft interrogating the beacon via the frequency of the pulse transmission channel. A database in the aircraft makes it possible to obtain the position and the frequency of each beacon. The transmission channels of the DME for the various beacons are 1 MHz apart.

Owing to its considerable coverage, the GPS receiver can receive in its frequency band a multitude of DME pulsed signals originating from several beacons situated on the ground. These signals transmitted at random instants and at frequencies spaced 1 MHz apart, cause degradation of the signal-to-noise ratio of the GPS receiver and, consequently, measurement errors.

In the general case, the effects of the interference of the pulsed signals on the receivers depend on numerous factors among which may be mentioned the peak power, the duty ratio, the pulse width.

GPS receivers in particular work with very low useful signal of levels of the order of −130 dBm, the level of the noise floor of the receiver. The type of coded digital modulation used in GPS receivers allows extraction of the useful signal for these weak reception levels. Under these conditions of very weak useful signal power received, a pulse of weak level at the input of the GPS receiver, of the order of 10 dB above the noise floor, may produce the saturation of the radiofrequency input stages and the saturation of the analog/digital converter of the receiver. Analog solutions may be developed to avoid these saturations. To be able to develop a digital solution, the radiofrequency input stages and the analog digital converter must be dimensioned so as to avoid this saturation while taking into account the interference environment.

To avoid disturbances of this type by DME a simple solution would consist in reassigning the frequencies of the DME, but if this solution is possible in the United States of America, it is not possible in Europe or in Japan on account of the high density of radio beacons.

SUMMARY OF THE INVENTION

There are currently numerous devices and procedures using anti-interference processing that make it possible to detect and eliminate from a signal received, interference in such a way as to recover at the output of the receiver a purified signal usable by a standard GPS receiver. Among these procedures may be mentioned that consisting in modifying the radiation pattern of the reception antenna so as to create a reception trough (or a zero) in the direction of the sources of disturbance, a technique known by the name "Controlled Reception Pattern Antenna" or CRPA for short.

Other procedures are based on estimates which are all the more accurate if carried out over relatively long durations for which the interference is present. These procedures have major drawbacks, on the one hand, they are poorly suited to intermittent interference and, on the other hand, they require in order to operate, in this latter particular case, that the interference be observed over a sufficiently long time interval, hence in particular, that it be geographically stable, this not being the case for pulsed interference.

Other procedures such as "adaptive filtering in the frequency domain" or that consisting in detecting the pulse and in turning off the receiver for the duration of the pulse ("pulse blanking") are potential solutions. The drawback with the first solution based on digital filtering techniques is related to the necessity for too large a computational power.

In the "pulse blanking" procedure, consisting in turning off the receiver for the duration of the DME pulses when they are detected in the signal received, the interference pulse is easily detectable through the fact that the signal normally received by the GPS receiver lies at the level of the thermal noise. For example, the detection of the pulse can be performed by the analog relative measurement of power of the radio signal or, more simply, when the signal received is digitized by an analog/digital converter, by an analysis of the histogram of the digital levels in real time. In the latter case, the suppression of the of pulses is performed by setting the digital output of the converter to zero, at the moment of the the pulses.

The "blanking" procedure is a simple technique which has, however, a major drawback, specifically, it produces considerable degradation of the signal-to-noise ratio of the receiver owing to the fact that, throughout the duration of the the pulses, the useful signal is turned off completely. In the case of receivers of GPS or GALILEO type, the useful signal may be turned off a great number of times at high altitude owing to the large number of DME ground beacons in sight of the aircraft and of the DME pulse repetition frequency.

The same problems arise in respect of spread band receivers receiving pulses used in the military sector, such as those of tactical air navigation equipment TACAN.

In order to alleviate the drawbacks of anti-interference devices of the prior art in radio receivers in particular those of GPS III or GALILEO, the invention proposes a method of suppressing pulsed signals in particular of DME or TACAN type present in the radio signals received by a radiofrequency receiver, characterized in that the reception frequency band of the receiver is chopped into frequency sub-bands corresponding to the transmission channels of the pulsed signals, in that the presence of the pulsed signals and the transmission channel of said pulsed signals in the frequency sub-bands are detected, and in that the frequency sub-band comprising the detected pulsed signals is filtered over the duration of the pulsed signal so as to eliminate said pulsed signals. This invention can use knowledge of the interference to be processed.

The DME is modulated by an integer frequency spaced 1 MHz apart: for example, 1174 MHz, 1175 MHz, 1176 MHz . . . The number of DME channels that can be regarded as a nuisance in the L5 band is at most twenty. It is possible to consider fewer channels: the disturbance of the central frequencies of the spread radionavigation signal has far more consequences than the disturbance of the side frequencies. Twenty channels will be taken as an example. FIG. 3 shows a schematic of the invention.

The first operation of the method is to determine the unknown parameters of the pulsed signals and then to eliminate them.

The invention also relates to a device for implementing the method according to the invention.

In an implementation of the method of suppressing pulsed signals, the chopping of the reception frequency band into twenty sub-bands is performed by a battery of detection filters FD1, FD2, . . . FD20 matched to the waveform. For example, this battery of detection filters may also be a battery of bandpass filters if no knowledge is used a priori regarding the shape of the interference or a battery of impulse response filters that is matched to the shape of the interference in each band, this amounting to performing a cross-correlation. The signal Ue to be processed enters this battery of filters through a common input E1, resulting in twenty signals of passband around 0.3 MHz at the respective outputs S1, S2, . . . S20 of the filters.

Each signal at the output of the bandpass filter FD1, FD2, . . . FD20 drives a respective detection device DD1, DD2, . . . DD20 for each sub-band. The detection device can be based on a simple measurement of power of the signal at the output of the detection filter. This power measurement is filtered and then compared with a threshold for each sub-band. The decision of the detection device is determined for each sub-band.

Advantageously, the detection device may be matched to the shape of the signal so as to improve the detection performance. On the basis of the information from the detection devices DD1, DD2, . . . DD20, a calculation Cg of template of frequencies to be eliminated and a calculation Cf of the rejection filter to be used are performed. The signals received Ue, after having undergone a delay Tr, are processed by an adaptive filter Fa of parameters emanating from the calculation Cf of the rejection filter.

Still other objects and advantages of the present invention will become readily apparent to those skilled in the art from the following detailed description, wherein the preferred embodiments of the invention are shown and described, simply by way of illustration of the bet mode contemplated of carrying out the invention. As will be realized, the invention is capable of other and different embodiments, and several details are capable of modification in various obvious respects, all without departing from the invention. Accordingly, the drawings are to be regarded as illustrative in nature, and not as restrictive.

DESCRIPTION OF THE DRAWINGS

The invention will be better understood with the aid of exemplary embodiments of devices for suppressing pulsed radio signals according to the invention, with reference to the appended drawings, in which.

BRIEF DESCRIPTION OF THE INVENTION

Figure 4:
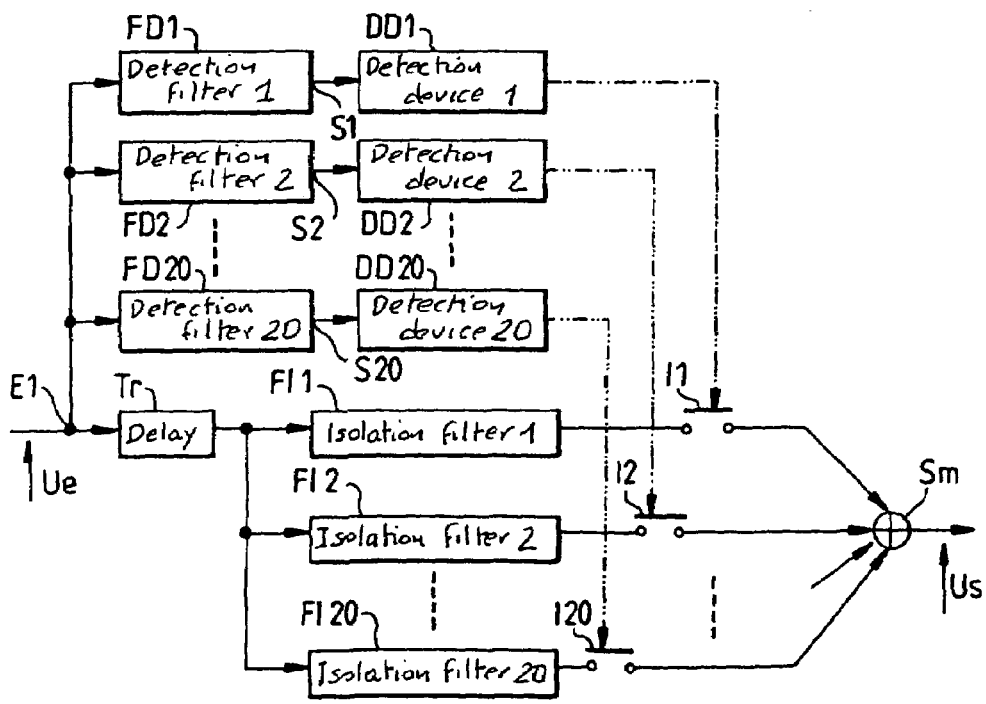
FIG. 4 represents a possible embodiment of the invention.

FIG. 4 represents a possible embodiment of the invention. The battery of detection filters FD1, FD2 . . . FD20 comprises a common input E1 driven by the signal received Ue, of passband 20 MHz, jammed by the DME. At the outputs S1, S2, . . . S20 of the detection filters are found the channels containing the useful signal, the thermal noise and the DME interference, if any. Each channel output S1, S2, . . . S20 drives its respective detection device DD1, DD2, . . . , DD20.

Each detection device DD1, DD2, . . . , DD20 makes it possible to measure and to filter the power of the signals on each channel. Comparison with respect to a threshold makes it possible to determine the presence or otherwise of DME interference in the twenty channels observed. The decisions of the detection device make it possible to determine the outputs of isolation filters FI1, FI2, . . . FI20 respective to each channel to be used in the result of the filtering through respective switches I1, I2, . . . , I20 controlled by their respective detection devices DD1, DD2, . . . , DD20. The signal received is delayed by a delay Tr before driving the isolation filters. The result of the isolation is a sum, by the summator Sm, of the signals at the output of the isolation filters.

The isolation filters FI1, FI2, . . . FI20 applied to the signal Ue to be processed are a battery of 20 bandpass isolation filters. The template of the isolation filters is matched to the spectrum of the signal to be eliminated. The decisions of the detection devices make it possible to determine the use or otherwise of the output of each isolation filter. If the useful signal is not disturbed, the result of the isolation is the sum of the signals at the output of the isolation filters. If the detection device has seen one or more disturbed frequencies in the useful signal, the result of the isolation is the sum of the isolation filters of the undisturbed sub-bands. In order not to worsen the signal in the absence of interference, the sum of the outputs of all the filters (signal Us) is equal to the input signal Ue. The transfer functions of the isolation filters must, therefore, be complementary.

Figure 1:
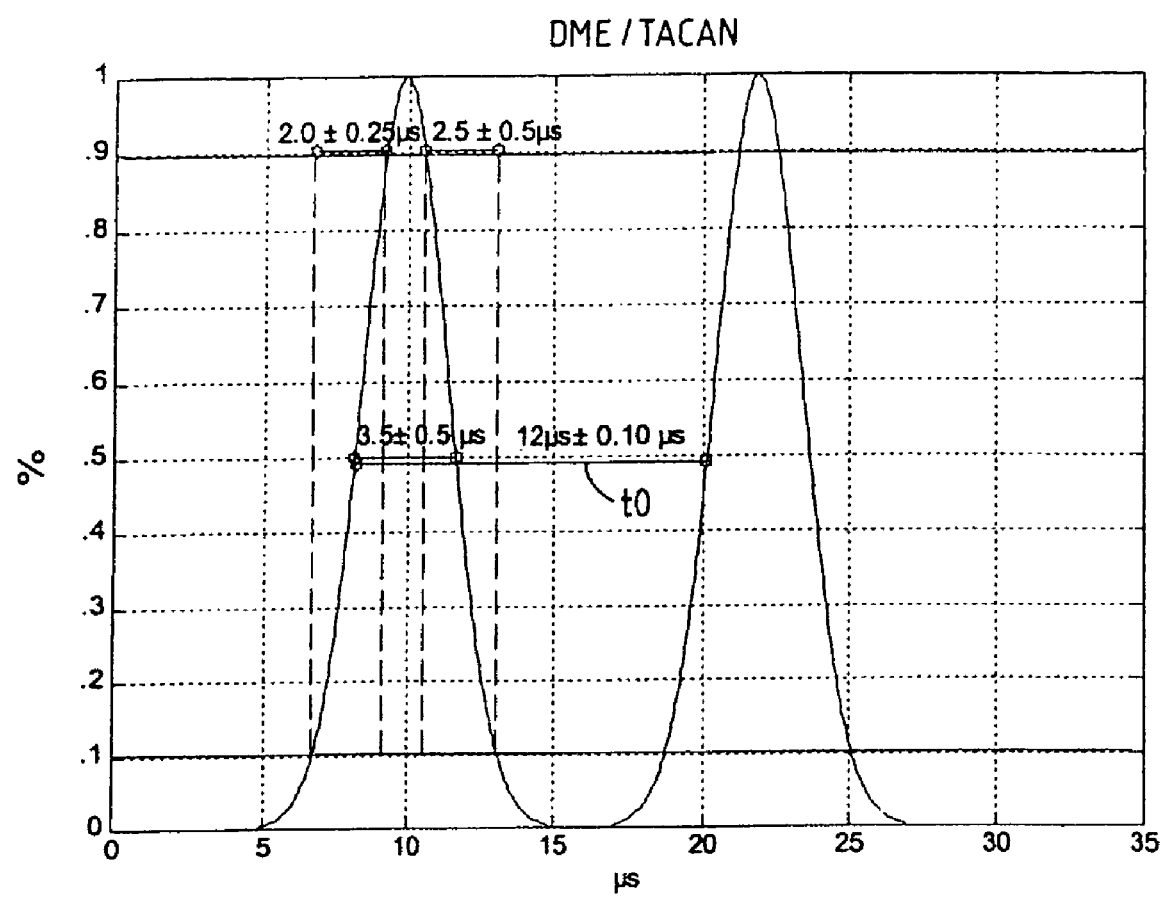
FIG. 1, already described, represents an exemplary pulsed signal.
Figure 2A:
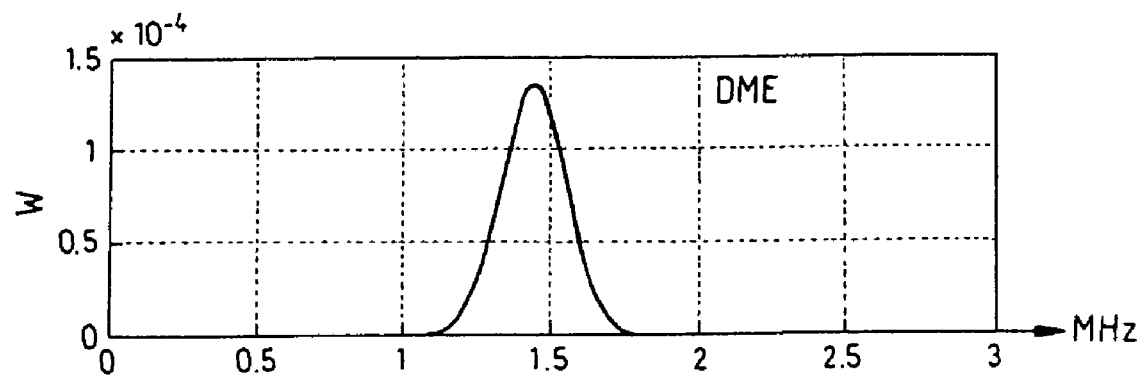
FIGS. 2a and 2b, already described, respectively represent the frequency profile of a pulse and of a pair of pulses.
Figure 2B:
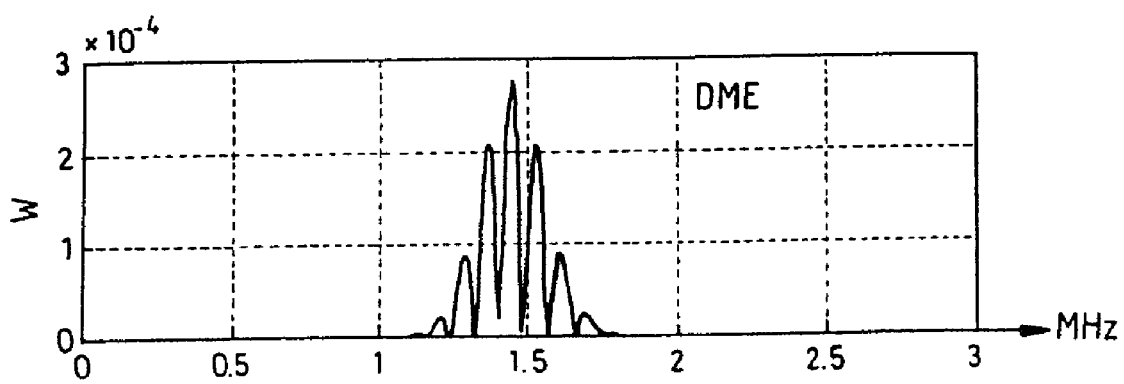
Figure 3:
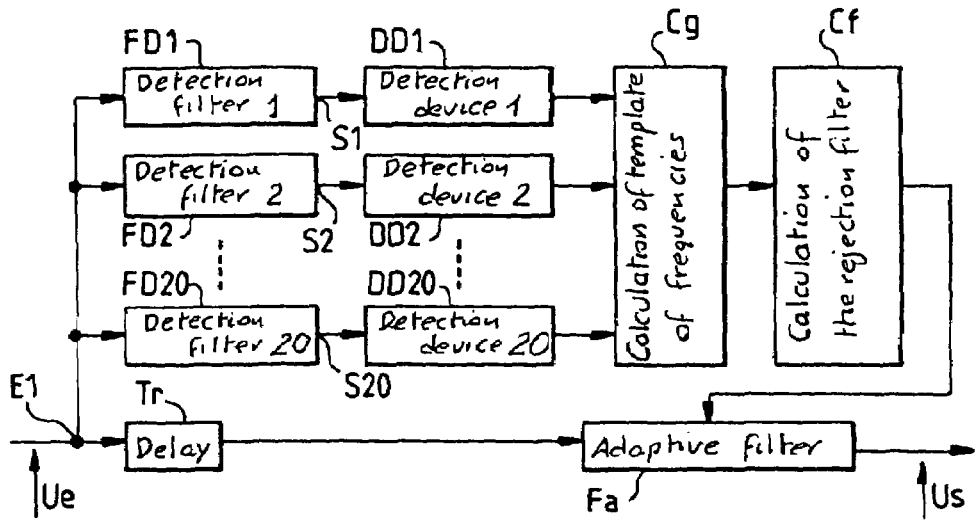
FIG. 3, already described, shows a schematic of the invention.

The assembly of devices FD1, FD2, . . . , FD20 of FIG. 3 is a battery of twenty filters, each filter having a passband Bs matched to the DME/TACAN signal substantially equal to 0.3 MHz.

Figure 5:
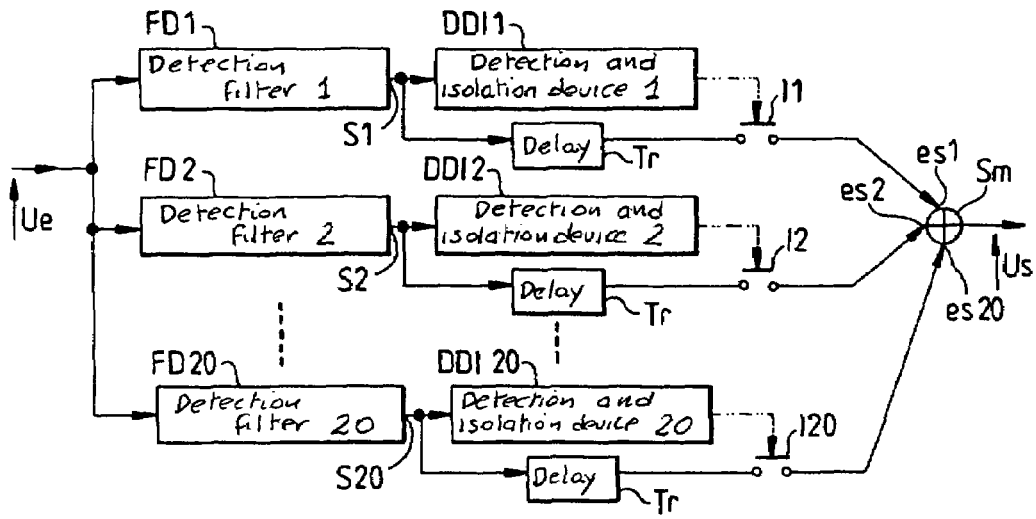
FIG. 5 constitutes a first variant of the device of FIG. 4.

FIG. 5 constitutes a first variant of the device of FIG. 4. In this first variant, the detection devices also serve for isolation. In this case, this device is of blanking type.

In the variant of FIG. 5, the input signal Ue being applied to the assembly of detection filters FD1, FD2, . . . , FD20, each channel output S1, S2, . . . S20 of the detection filters drive on the one hand, a respective detection and isolation device DDI1, DDI2, . . . DDI20 and, on the other hand, respective inputs es1, es2, . . . es20 of a summator Sm through the delay Tr and a respective switch I1, I2, . . . , I20 controlled by the associated detection and isolation device DDI1, DDI2, . . . , DDI20.

Figure 6:
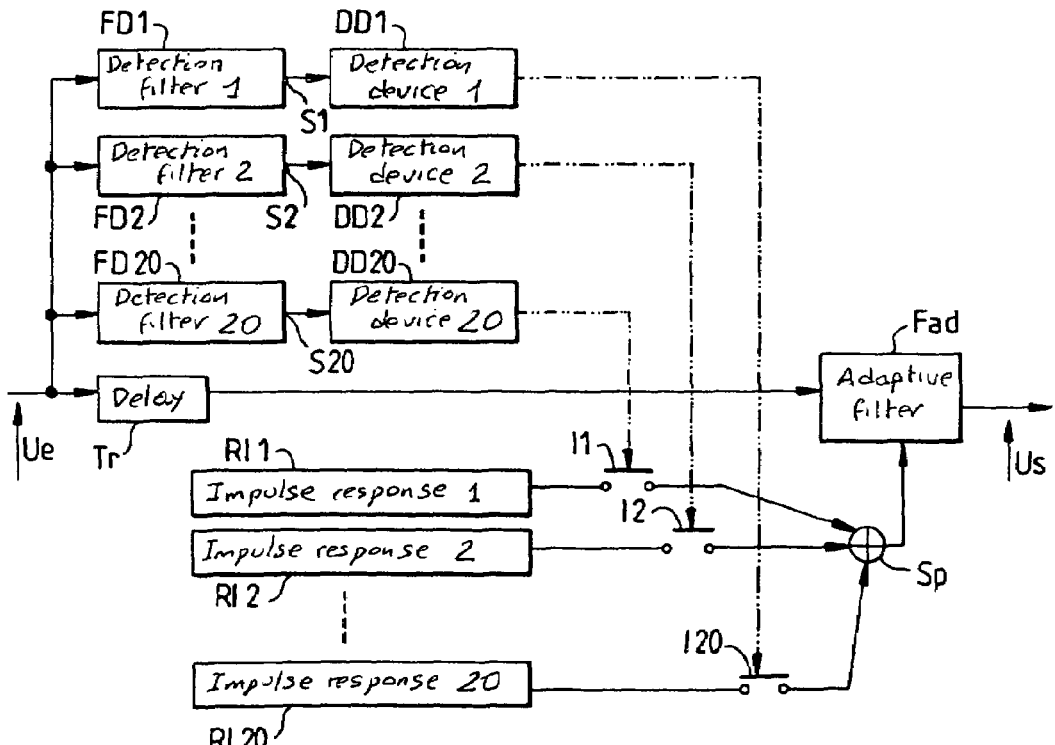
FIG. 6 constitutes a second variant of the device of FIG. 4.

FIG. 6 constitutes a second variant of the device of FIG. 4. The bank of isolation filters is replaced with a convolutional adaptive filter Fad of FIR type whose impulse response is the sum of the impulse responses corresponding to each frequency band, except the disturbed ones.

In the embodiment of the second variant, shown in FIG. 6, each output S1, S2, . . . S20 of each detection filter FD1, FD2, . . . , FD20 drives its respective detection device DD1, DD2, . . . , DD20. The input signal Ue is applied on the one hand to the inputs of the detection filters and on the other hand to the input of the convolutional adaptive filter Fad of FIR type through the delay Tr. Each impulse response RI1, RI2, . . . RI20, corresponding to each channel band, is applied through its respective switch I1, I2, . . . , I20 controlled by its respective detection device DD1, DD2, . . . , DD20, to a summator Sp producing the sum of the impulse responses, corresponding to each frequency band, except the disturbed ones, the impulse response of the filter Fad being that provided by the summator Sp.

The interference suppression method according to the invention is optimized because the characteristics of the DME/TACAN are taken into account.

One of the advantages of the method and of the devices for implementing the method according to the invention lies in the fact that a small part of the band received is suppressed in the presence of the pulses, in the order of 1 MHz (DME channel) on the 20 MHz passband of the signal received and only for very short times corresponding to the durations of the DME/TACAN pulse (a few microseconds), the signal received in the sub-band considered between two consecutive pulses not being turned off. In this way the signal is received by the receiver between the pulses hence for almost the entire time.

With a random modulation code as used in GPS or GALILEO type receivers, these holes in the reception band of short duration producing almost no measurement error in the receiver. The probability of completely blocking the signal received is almost zero as compared to the "pulse blanking" device of the prior art which suppresses the entire signal received by the receiver for the duration of the pulsed signals.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of suppressing pulsed radio received (Ue) by a radio-frequency receiver, comprising the steps of:
   dividing a reception frequency band of the radio-frequency receiver into frequency sub-bands corresponding to transmission channels of pulsed signals;
   detecting the presence of the pulsed signals by measuring power signals in the frequency sub-bands with the transmission channel corresponding to the sub-band presenting the pulsed signals; and
   filtering one of the frequency sub-bands including the detected pulsed signals over the duration of the pulsed signal so as to eliminate said pulsed signals.

2. The method of suppressing pulsed signals as claimed in claim 1, wherein the step of dividing the reception frequency band is performed by a battery of detection filters matched to the waveform.

3. The method of suppressing pulsed signals as claimed in claim 2, wherein each signal at the output of the detection filter drives a respective detection device for each sub-band.

4. The method of suppressing pulsed signals as claimed in claim 3, wherein on the basis of the information from the detection devices, a calculation of template of frequencies to be eliminated and a calculation of the rejection filter to be used are performed, the signals received, after having undergone a delay, being processed by an adaptive filter of parameters emanating from the calculation of the rejection filter.

5. The method of suppressing pulsed signals as claimed in claim 3, wherein the battery of detection filters is a battery of bandpass filters.

6. The method of suppressing pulsed signals as claimed in claim 2, wherein the battery of detection filters is a battery of bandpass filters.

7. The method of suppressing pulsed signals as claimed in claim 2, wherein the battery of detection filters is a battery of impulse response filters.

8. The method of suppressing pulsed signals as claimed in claim 7, wherein the detection device is based on a simple measurement of power of the signal at the output of the detection filter, this power measurement being filtered and then compared with a threshold for each sub-band, the decision of the detection device being determined for each sub-band.

9. The method of suppressing pulsed signals as claimed in claim 8, wherein on the basis of the information from the detection devices, a calculation of template of frequencies to be eliminated and a calculation of the rejection filter to be used are performed, the signals received, after having undergone a delay, being processed by an adaptive filter of parameters emanating from the calculation of the rejection filter.

10. The method of suppressing pulsed signals as claimed in claim 9, wherein the reception frequency band of the receiver is chopped into twenty sub-bands.

11. The method of suppressing pulsed signals as claimed in claim 1, wherein the detection device is based on a simple measurement of power of the signal at the output of the detection filter, this power measurement being filtered and then compared with a threshold for each sub-band, the decision of the detection device being determined for each sub-band.

12. The method of suppressing pulsed signals as claimed in claim 1, wherein the reception frequency band of the receiver is chopped into twenty sub-bands.

13. The method of claim 1, wherein the pulsed radio signal are one of DME and TACAN type.

14. The method of claim 13, wherein the pulsed radio signal are one of DME and TACAN type.

15. A device for suppressing pulsed signals present in radio signals received by a radio-frequency receiver, a reception frequency band of the receiver being divided into frequency sub-bands corresponding to transmission channels of the pulsed signals, comprising:
- a battery of detection filters dividing the reception frequency band into frequency sub-bands, the battery of detection filters having a common input driven by the signal received and channel outputs:
- each signal at the channel output drives a respective detection device for each sub-band for measurement of the power of the signal at the output of the detection filter, this power measurement being filtered and then compared to a threshold for each sub-band to determine the presence or otherwise of pulsed signal in observed channels.

16. The device for suppressing pulsed signals as claimed in claim 15, wherein each channel output drives a respective detection device, the decisions of the detection device making it possible to determine the outputs of isolation filters respective to each channel to be used in the result of the filtering through respective switches controlled by their respective detection devices, the signal received being delayed by a delay before driving the isolation filters, the result of the isolation being the sum, by the summator, of the signals at the output of the isolation filters.

17. The device for suppressing pulsed signals as claimed in claim 16, wherein the transfer functions of the isolation filters are complementary.

18. The device for suppressing pulsed signals as claimed in claim 15, wherein each channel output of the detection filters drive on the one hand, a respective detection and isolation device and, on the other hand, respective inputs of a summator through a delay and a respective switch controlled by the associated detection and isolation device.

19. The device for suppressing pulsed signals as claimed in claim 15, wherein the respective output of each detection filter drives its respective detection device, the input signal being applied on the one hand to the inputs of the detection filters and on the other hand to the input of a convolutional adaptive filter Fad of FIR type through the delay, each impulse response, corresponding to each channel band, being applied through its respective switch controlled by its respective detection device, to a summator producing the sum of the impulse responses, corresponding to each frequency band, except the disturbed ones, the impulse response of the filter Fad being that provided by the summator.

20. The device for suppressing pulsed signals as claimed in claim 15, wherein the assembly of detection filters is a battery of twenty filters, each filter having a passband Bs matched to the DME/TACAN signal substantially equal to 0.3 MHz.

* * * * *